July 1, 1924.

M. SINGER

FIGURE VELOCIPEDE

Filed July 27, 1923　　3 Sheets-Sheet 1

INVENTOR

Max Singer.

BY

ATTORNEYS

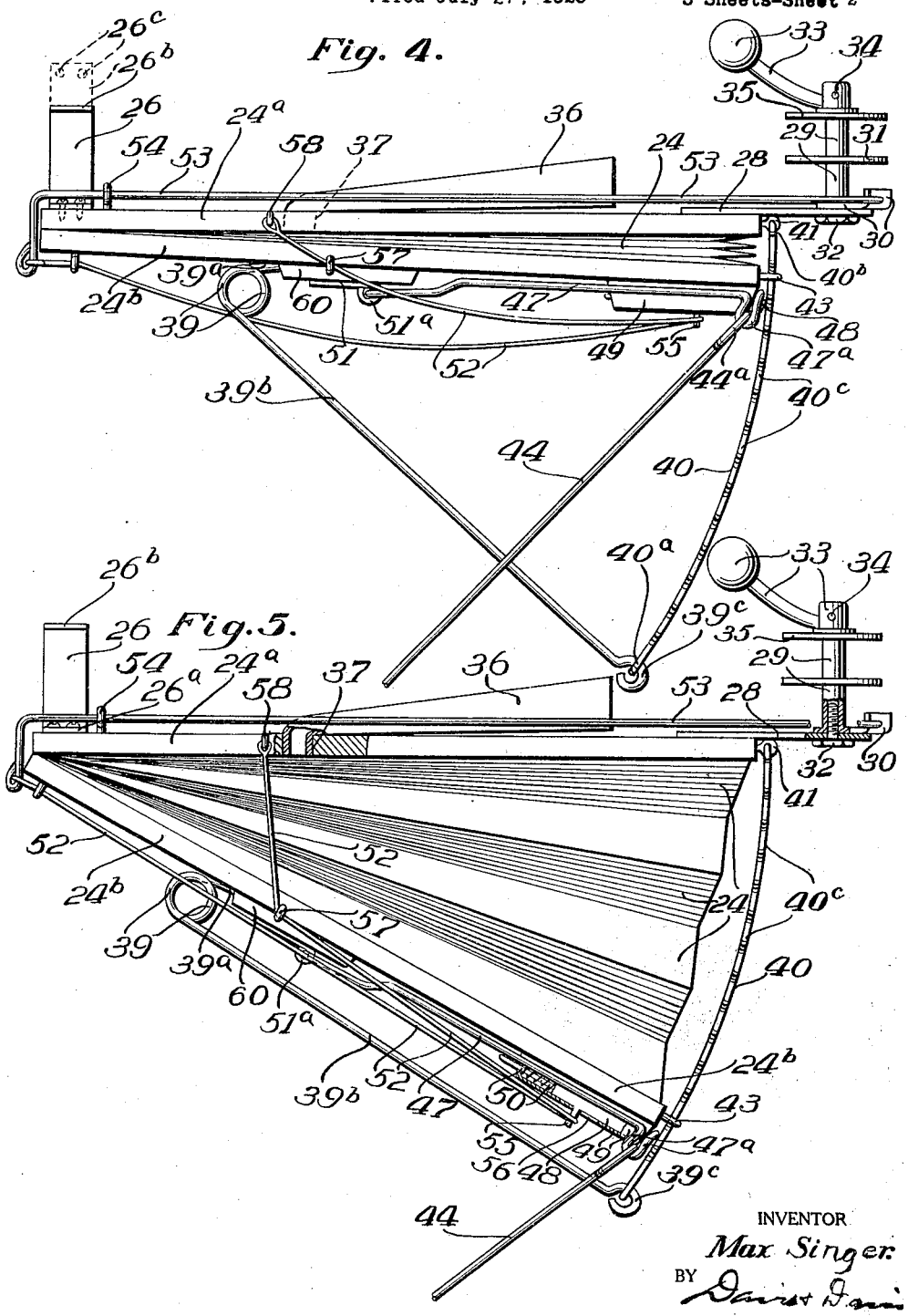

July 1, 1924.

M. SINGER

FIGURE VELOCIPEDE

Filed July 27, 1923

1,499,884

3 Sheets-Sheet 3

INVENTOR:
Max Singer:
BY
Davis Davis
ATTORNEYS

Patented July 1, 1924.

1,499,884

UNITED STATES PATENT OFFICE.

MAX SINGER, OF NEWARK, NEW JERSEY.

FIGURE VELOCIPEDE.

Application filed July 27, 1923. Serial No. 654,191.

*To all whom it may concern:*

Be it known that I, MAX SINGER, a citizen of no country, and resident of the city of Newark, in the county of Essex and State of New Jersey, have invented certain new and useful Improvements in Figure Velocipedes, of which the following is a specification.

This invention relates to improvements in figure velocipedes, and has for its principal objects to provide a simply and strongly constructed velocipede of the tricycle type in which the frame comprises an artificial animal form upon which a rider may sit; to provide a figure tricycle in which the steering frame comprises a quadruped figure having a rotatable head connected with the steering wheel fork to turn the fork; to provide an occupant-propelled quadruped figure mounted on wheels and having a head and front legs rotatable in unison with a steering post connected with the front axle of the wheeled figure; to provide a figure velocipede provided with sound producing means operated automatically by movement of the velocipede and manually controlled means for rendering the sound producing means inoperative; to provide a figure velocipede provided with means for periodically simulating a call or cry of the figure represented; to provide a figure velocipede having a frame constructed to represent an animal which gives a bleating or similar pulsating call, the frame having embodied therein sound producing means operable by movement of the velocipede to produce a bleating or similar pulsating sound; to provide a figure velocipede provided with a horn and means operable from a moving part of the velocipede for periodically forcing air through the horn, the air-forcing means being constructed to force air continuously through the horn during each period of operation alternately rapidly and slowly to produce a bleating sound.

Figure 1:
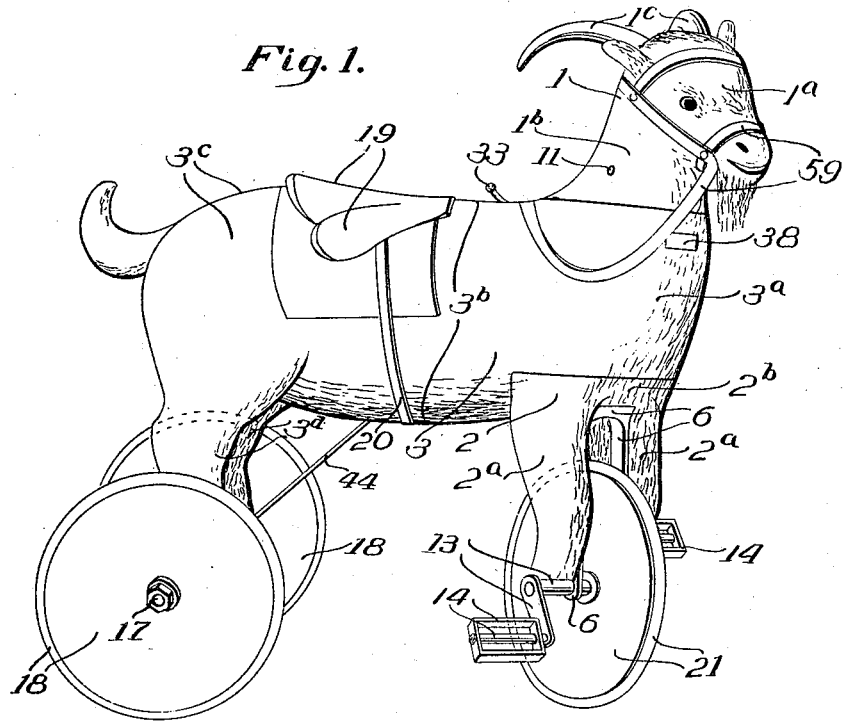
Figure 2:
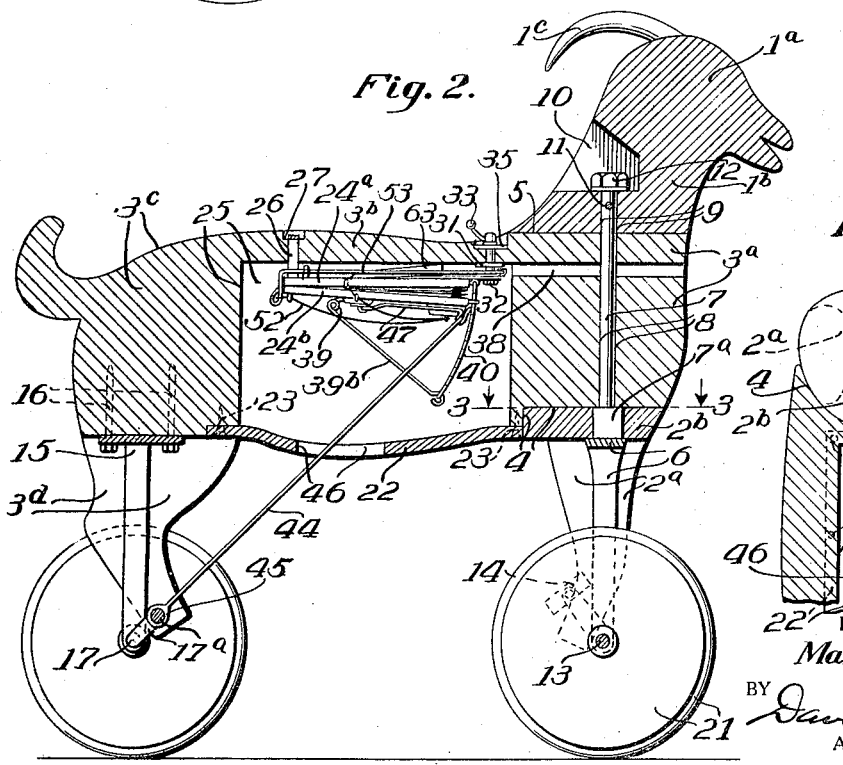
Figure 3:
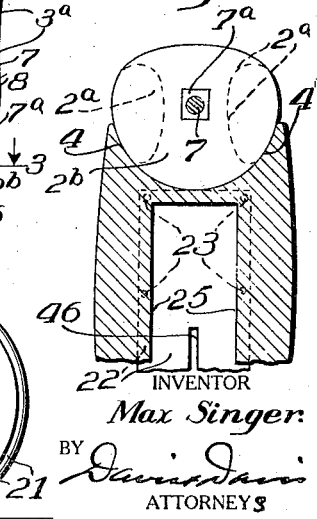
Figure 6:
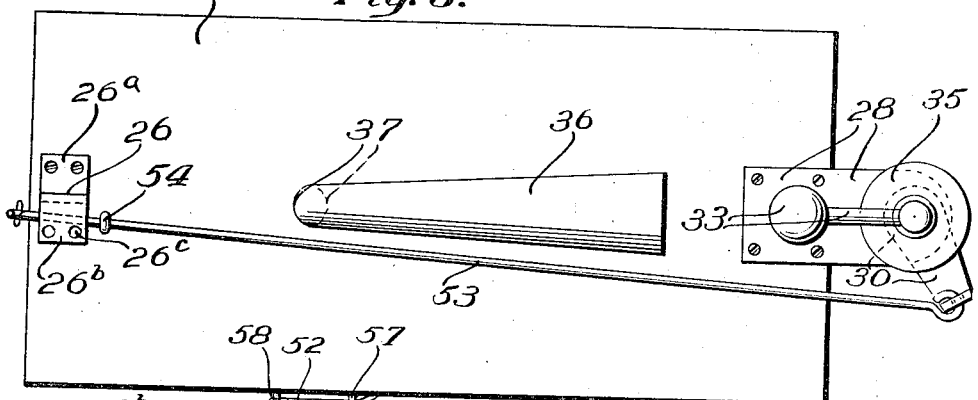
Figure 7:
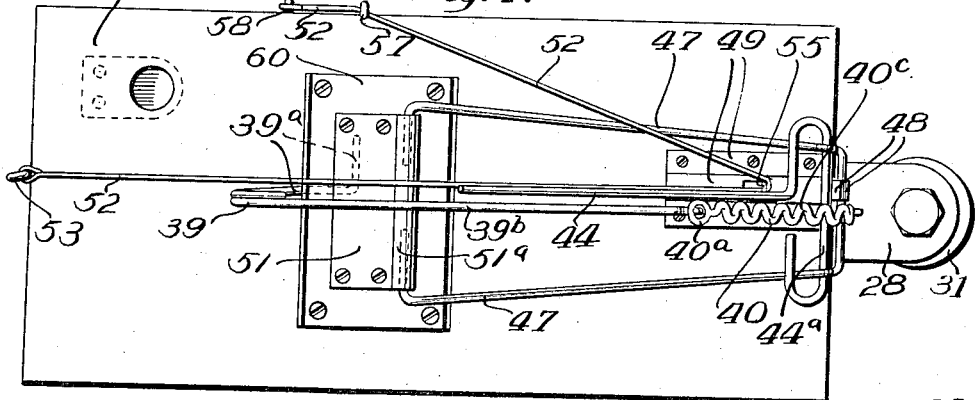
Figure 8:
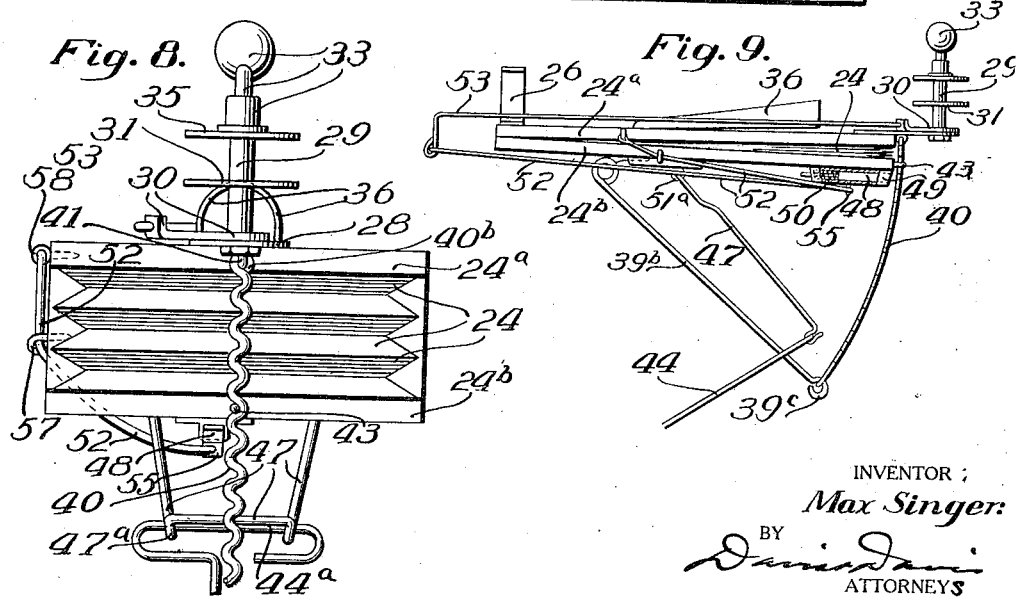
Figure 9:
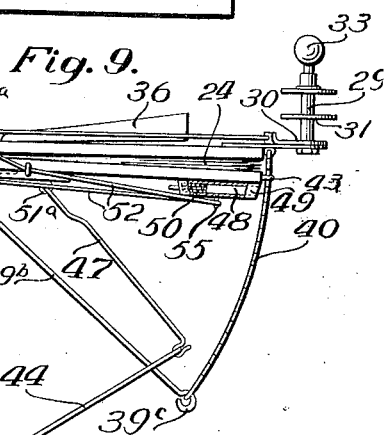

In the accompanying drawings, wherein the preferred embodiment of the invention is illustrated, Figure 1 is a perspective view of a figure tricycle embodying the invention, the frame of which is constructed to resemble a goat;

Fig. 2 is a vertical longitudinal sectional view of the tricycle;

Fig. 3 a horizontal section on the line 3—3 of Fig. 2;

Fig. 4 a side elevation of the sound-producing means, showing the bellows closed and the axle-operated bellows-opening means connected therewith ready to start the bellows-opening operation;

Fig. 5 a side elevation showing the bellows opened and released from the axle-operated means to permit closing of the bellows by the spring;

Fig. 6 a top plan view of the sound producing means;

Fig. 7 a bottom plan view of the sound producing means, the parts being in the positions shown in Figs. 2 and 4;

Fig. 8 a front elevation of the sound-producing means showing the bellows partly closed; and Fig. 9 a side elevation of the sound-producing means, the manually adjustable means being shown set to prevent engagement of the bellows-opening means with the hinged bellows board, and the bellows-opening means being shown at the lower limit of its throw.

The goat figure, which is preferably formed of wood carved to shape, is made in three independent sections 1, 2 and 3. The section 1 consists of the head $1^a$ and neck $1^b$. The section 2 consists of the front legs $2^a$ and a disk-like part $2^b$ formed integrally therewith and connecting said legs at their upper ends. The section 3 consists of the chest portion $3^a$, barrel portion $3^b$, rump portion $3^c$, and the hind legs $3^d$. The part $2^b$ is seated loosely in a segmental recess 4 formed in the under side of the chest portion $3^a$ and the flat lower end of the neck $1^b$ is seated loosely on the flat upper surface 5 of the chest portion. A metal fork 6 extends downwardly from the bottom of disk $2^b$ between the front legs $2^a$, and a steering post 7 formed integrally with the fork 6 extends upwardly through disk $2^b$ and a vertical bore 8 in the chest portion and thence through a central or substantially centrally arranged, vertical bore 9 in the neck $1^b$ leading to a recess 10 in the neck. Post 7 is formed with an enlarged squared portion $7^a$ at its lower end fitting in a square hole in disk $2^b$ so that section 2 will rotate in unison with the post. Section 1 is locked to the post in any suitable manner to permit rotation of the post through the medium of section 1, such as by driving a pin 11 horizontally through neck 1ᵇ and a transverse hole in post 7. A nut 12 is preferably screwed on the upper end of post 7 in the recess 10 to assist in holding the parts in assembled relation. The vertical wall of recess 4 and the adjacent edge of disk 2ᵇ are curved on an arc of which the axial line of post 7 is the center.

A propelling crank axle 13 of ordinary construction is journalled in the lower ends of the vertical arms of the fork 6 and is provided at its ends with the usual pedals 14. A metal disk wheel 21 of ordinary construction is keyed or otherwise rigidly held to the axle 13 between the arms of the fork.

A rear axle bracket 15 of inverted U-shape is rigidly secured at its upper end to the under side of the rump portion 3ᶜ between the hind legs 3ᵈ, preferably by means of screws 16. The rear axle 17 is journalled in the lower ends of the vertical arms of bracket 15 and is formed with a central crank portion 17ᵃ located between said arms. A pair of metal disk wheels 18 are keyed or otherwise rigidly affixed to the ends of axle 17, outside of the legs 3ᵈ, so that said axle will rotate when wheels 18 turn. A small riding saddle 19 is preferably held to the barrel portion 3ᵇ of section 3 by a suitable girth or strap 20 to form a seat for the rider, and a bridle 59 is preferably secured on the head 1ᵃ to permit the rider to readily turn section 1 and post 7 in either direction. The section 1 may, however, be turned by using the horns 1ᶜ as handle bars, said horns being rigidly held to head 1ᵃ, and preferably formed integrally therewith as shown. The sections 1, 2 and 3 may be painted or covered with hide to closely simulate the appearance of a goat.

The barrel portion 3ᵇ of section 3 is formed with a relatively long and narrow chamber or cavity 25 extending fore and aft of the figure and open at its lower side. The open side of the chamber is closed by a detachable plate 22 held to section 3 by screws 23. A bellows 24 is supported in chamber 25, the top board 24ᵃ of the bellows being rigidly supported at its rear end by a bracket 26 having feet 26ᵃ secured to the bellows board. The vertical arm of bracket 26 is passed up through a slot in the top wall of chamber 25 and then bent laterally as shown at 26ᵇ down upon the bottom wall of a recess 27 in the top barrel section 3ᵇ and secured by suitable screws or nails passing through the holes 26ᶜ in part 26ᵇ. A metal plate 28 projects forwardly from the fixed bellows board 24ᵃ and is screwed down on said board at its rear end. A rotatable post 29 having a crank arm 30 rigidly fixed on its lower end extends upwardly from the top face of the projecting end of the plate 28 through the top wall of chamber 25, said post having a fixed collar 31 thereon engaging the top wall of the chamber. A screw bolt 32 extends loosely through an aperture in the plate 28 and is screwed into a threaded socket in the lower end of the post. The socket end of a crank handle 33 is rigidly held to the upper end of the post by a pin 34, or in any other suitable manner, and a loose washer 35 is preferably mounted on the post between the handle and upper surface of part 3ᵇ, the washer being preferably countersunk as shown. The board 24ᵃ of the bellows is thus rigidly held at both ends against movement in any direction.

The bellows 24 is of ordinary construction and is arranged with the hinged ends of the bellows boards 24ᵃ and 24ᵇ adjacent the rear wall of the chamber 25. A small reed horn 36 of ordinary construction has its inlet end bent down and frictionally held in the usual air outlet aperture 37 of the bellows which is formed in the bellows board 24ᵃ. Horn 36 extends forwardly over board 24ᵃ and has its outlet end arranged in register with a slot 38 extending from the front of chest portion 3ᵃ to the forward end of chamber 25. Slot 38 is relatively wide as shown in Fig. 1 so as not to be closed by the post 7, and forms a sound outlet terminating near the mouth of the animal figure.

The bellows-closing spring is formed of a length of spring wire coiled intermediate its ends at 39 and having one forwardly extending arm 39ᵃ clamped at its forward end between bellows board 24ᵇ and a block 60 which is held against the bottom of said bellows board by screws. Spring arm 39ᵃ is preferably bent laterally at its forward end as shown in Fig. 7 to prevent rotation thereof. The remaining arm 39ᵇ of spring 39 extends forwardly and downwardly midway the side edges of the bellows board 24ᵇ and has its forward end formed into a loop or eye 39ᶜ passing through a loop or eye 40ᵃ formed at the lower end of an arcuate rod or link 40. Arcuate member 40 is formed with an eye or loop 40ᵇ at its upper end passing through a screw eye 41 the shank of which is screwed into the forward edge of bellows board 24ᵃ midway between the side edges of the board. A pin 43 driven into the forward edge of bellows board 24ᵇ midway between the side edges of the board projects forwardly beyond the arcuate member 40 which is bent laterally alternately in opposite directions to points at opposite sides of the plane of movement of the pin 43. Member 40 is curved from front to rear on an arc struck from the pivotal axis of the bellows board 24ᵇ and as said member is laterally sinuous it will be obvious that the humps 40ᶜ will intermittently retard upward movement of pin 43 and bellows board 24ᵇ under influence of spring 39. The humps will not, however, prevent closing of the bellows as member 40 may yield or vibrate laterally as the pin rides over humps 40$^c$ owing to the pivotal connection 41—40$^b$ with bellows board 24$^a$ and the pivotal connection 39$^c$—40$^a$ with arm 39$^b$ of spring 39, which spring arm 39$^b$ will vibrate or rapidly flex laterally as the pin 43 rides along one sinuous edge of the member 40. The spring is sufficiently strong to cause the bellows to close quickly with a jerky motion so as to force a continuous but pulsating current or blast of air through the horn for a brief period to thereby produce a bleating or pulsating sound resembling the bleating of a goat during the period of each closing movement of the bellows.

The bellows is normally adapted to be opened after each closing movement thereof when the tricycle is in motion through the medium of the rear crank axle 17—17$^a$. A rigid wire link or pitman rod 44 is pivotally connected at its lower end by an eye 45 to the wrist of the crank 17$^a$. The link 44 extends upwardly and forwardly through a longitudinal slot 46 in cover plate 22 and is bent at its upper end to provide a crossbar 44$^a$ journalled in bearing loops or eyes 47$^a$ formed in the side arms of a wire bail 47 the front cross-bar of which is adapted to ride up over the downwardly and rearwardly beveled nose of a latch bolt 48 normally projected forwardly from a latch housing 49 by a spring 50. The latch housing is fastened to the under side of bellows board 24$^b$ at the forward end of the board and slightly to one side of the longitudinal center line of the board. The rear ends of the side arms of bail 47 are bent inwardly and journalled in a bearing sleeve 51$^a$ formed on a plate 51 fastened to the under side of block 60.

A latch-controlling cord 52 is provided which is adjustable by a longitudinally reciprocable rod 53 to automatically retract the latch bolt 48 from beneath the cross-bar of bail 47 after each opening movement of the bellows and release the latch during each closing movement of the bellows, when rod 53 is in one position, and to continuously hold the latch retracted when the rod 53 is in another position to thereby prevent engagement of the bail with the latch bolt and prevent operation of the bellows from the rear axle. The rod 53 is pivotally connected at its forward end to the outer end of rock arm 30 on the rock shaft 29, and is guided in the loop of a screw eye 54 screwed into bellows board 24$^a$ near the rear end of said board, the rear end of the rod being bent downwardly at the rear of the bellows to a point below the rear end of bellows board 24$^b$. The cord 52 is fastened at one end to the downwardly bent rear end of rod 53 and passes forwardly through an aperture in a depending lug 55 on latch bolt 48, which lug projects through a slot 56 in the latch housing. From lug 55 the cord passes rearwardly and laterally under one side arm of bail 47 through the loop of a screw eye 57 which is screwed into the right hand side edge of bellows board 24$^b$ intermediate the ends of the board. The cord passes upwardly and rearwardly from screw eye 57 and is fastened at its other end to a screw eye 58 screwed into the right hand side edge of bellows board 24$^a$ slightly at the rear of screw eye 57.

It will be observed that, when the manually operable crank device 33—29—30 is adjusted to shift rod 53 forwardly as shown in Figs. 2, 4, 5, 6, 7 and 8, there is substantial slack in cord 52 when the bellows is closed (as shown in Figs. 2, 4 and 7) so that latch bolt 48 is projected forwardly by spring 50. It will be evident, therefore, that, when the tricycle is in motion, as bail 47 is swung upward by the crank 17$^a$ and pitman 44 the cross-bar of the bail will ride over the latch bolt, temporarily pressing the bolt rearwardly, so that the bolt will snap under the bail as the crank reaches the position shown in Fig. 2. As the crank continues to revolve the pitman is pulled downward, drawing down the bellows board 24$^b$ and thus drawing air into the bellows. As the crank wrist reaches a point diametrically opposite that shown in Fig. 2, the screw eye 57 will be moved so far from the eye 58 that all the slack will be taken up and the length of cord between the rear end of rod 53 and eye 57 so shortened as to retract the latch bolt from under the bail (as shown in Fig. 5), thus freeing the bellows from the crank and pitman bellows-opening mechanism. Spring 39 will thereupon quickly close the bellows, before the crank 17$^a$ completes the last half of its revolution, to force the air out of the bellows through horn 36. As pin 43 rides over each hump 40$^c$ on curved bar 40 the rapid closing movement of the bellows will be retarded for an instant thus causing a momentary reduction in the force of the air blast through the horn. The pulsating air blast forced through the horn during each closing movement of the bellows causing the horn to emit a pulsating sound for a short time resembling the bleating of a goat. As long as rod 53 is in forward position the artificial animal will bleat for a short time during each revolution of the rear crank axle.

The horn sounding mechanism may be cut out of action by rocking handle 33 to the position shown in Fig. 9 so as to project rod 53 rearwardly sufficiently to take up the slack in cord 52 and pull back latch 48 out of the path of the front cross-bar of the bail 47. As long as handle 33 is held in this position bail 47 will be moved up and down by the crank 17$^a$ and pitman 44 without being locked to bellows board 24$^b$ at any time and the bellows will be held closed by spring 39.

What I claim is:

1. In a velocipede, the combination of an animal figure frame, a wheeled running gear supporting the frame, a horn, an air blower for sounding said horn, an operative connection between the running gear and the blower whereby the blower is operated when the velocipede is in motion, and adjustable means for rendering the said operative connection between the running gear and the blower ineffective.

2. In a velocipede, the combination of an animal figure frame, a wheeled running gear supporting the frame, a horn, a bellows for sounding said horn, a pitman connection between the running gear and the bellows whereby the bellows is operated when the velocipede is in motion, and adjustable means for rendering said pitman connection ineffective to operate the bellows.

3. In a velocipede, the combination of a frame, a wheeled running gear supporting the frame, a horn, a bellows for sounding said horn, an operative connection between the running gear and the bellows whereby the bellows is expanded, and means adapted to automatically contract the bellows independently of the said operative connection.

4. In a velocipede, the combination of an animal figure frame, foot-operated wheeled propelling and supporting means for the frame, an air bellows, a horn connected with the air outlet of the bellows, a spring for closing the bellows, means connected with said propelling means for opening the bellows, and means for periodically making and breaking an operating connection between the bellows and said bellows-opening means.

5. In a velocipede, the combination of an animal figure frame, foot-operated wheeled propelling and supporting means for the frame, an air bellows, a horn connected with the air outlet of the bellows, a spring for closing the bellows, means connected with said propelling means for opening the bellows, means for periodically making and breaking an operating connection between the bellows and said bellows-opening means, and means for intermittently retarding each closing movement of the bellows.

6. In a velocipede, the combination of an animal figure frame, foot-operated wheeled propelling and supporting means for the frame, an air bellows, a horn connected with the air outlet of the bellows, a spring for closing the bellows, means connected with said propelling means for opening the bellows, means for periodically making and breaking an operating connection between the bellows and said bellows-opening means, and manually adjustable means for rendering said connection making and breaking means ineffective to establish an operating connection between the bellows and the bellows-opening means.

7. In a velocipede, the combination of an animal figure frame, foot-operated wheeled propelling and supporting means for the frame, an air bellows, a horn connected with the air outlet of the bellows, a spring for closing the bellows, means connected with said propelling means for opening the bellows, means for periodically making and breaking an operating connection between the bellows and said bellows-opening means, manually adjustable means for rendering said connection making and breaking means ineffective to establish an operating connection between the bellows and the bellows-opening means, and means for retarding each closing movement of the bellows by the spring at intervals.

8. In a vehicle for children the combination of a frame, a wheeled running gear supporting the frame, a horn, a bellows for sounding said horn, an operative connection between the running gear and the bellows whereby the bellows is expanded, a spring adapted to contract the bellows automatically and independently of the said operative connection and adjustable means for rendering the said operative connection ineffective.

9. In a vehicle for children, the combination of a frame, a wheeled running gear supporting the frame, a horn, a bellows for sounding the horn, an operative connection between the running gear and the bellows whereby the bellows is expanded, means adapted to contract the bellows automatically and independently of the said operative connection, and means for retarding the contracting movement of the bellows.

10. In a vehicle for children the combination of a frame, a horn, a bellows for sounding the horn, a rockable arm, an operative connection between the running gear and the said arm whereby the arm is constantly rocked when the vehicle is in motion, means to automatically lock the bellows to the said arm when the bellows is closed whereby the bellows is opened when the arm is rocked, means to automatically unlock the arm from the bellows when the bellows has opened to a certain degree and means to automatically close the bellows independently of the rocking arm.

11. In a vehicle for children the combination of a frame, a wheeled running gear supporting the frame, a horn, a bellows for sounding the horn, a rockable arm, an operative connection between the running gear and the said arm whereby the arm is constantly rocked when the vehicle is in motion, means to automatically lock the bellows to the said arm when the bellows is closed whereby the bellows is opened when the arm is rocked, means to automatically unlock the arm from the bellows when the bellows has opened to a certain degree, means to automatically close the bellows independently of the rocking arm and adjustable means for rendering the said locking means inoperative for opening the bellows.

12. In a vehicle for children, the combination of a frame, a wheeled running gear supporting the frame, a horn, a bellows for sounding the horn, a rockable arm, an operative connection between the running gear and said arm whereby the arm is rocked when the vehicle is in motion, a spring projected latch adapted to automatically lock the bellows to said arm when the bellows is closed whereby the bellows is opened when the arm is rocked, a flexible strand connected to said latch, means to automatically exert a pull upon said strand to retract the latch and release the rocking arm from the bellows when the bellows has been opened and a spring adapted to automatically close the bellows independently of the rocking arm.

13. In a vehicle for children the combination of a frame, a wheeled running gear supporting the frame, a horn, a bellows for sounding the horn, a rockable arm, an operative connection between the running gear and said arm whereby the said arm is rocked when the vehicle is in motion, a spring projected latch adapted to automatically lock the bellows to said arm when the bellows is closed whereby the bellows is opened when the arm is rocked, a flexible strand connected to said latch, means to automatically exert a pull upon said strand to retract the latch and release the rocking arm from the bellows when the bellows has been opened, means to automatically close the bellows independently of the rocking arm, and adjustable means to maintain a tension upon the said strand to hold the latch retracted and prevent the opening of the bellows by the rocking arm.

14. In a vehicle for children, the combination of a frame, a wheeled running gear, a horn, a bellows for sounding said horn, an operative connection between the running gear and the bellows whereby the bellows is expanded, means adapted to contract the bellows automatically and independently of said operative connection, and means for intermittently retarding each closing movement of the bellows, said retarding means comprising a sinuous guide and a projection on the bellows adapted to travel over the guide in the closing movement of the bellows.

In testimony whereof I hereunto affix my signature.

MAX SINGER.